Figure 4A:
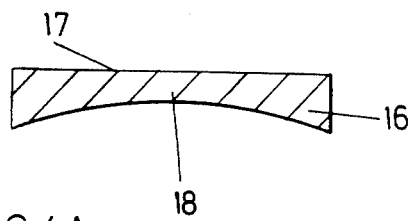

United States Patent
Collier

[11] 4,019,804
[45] Apr. 26, 1977

[54] OPTICAL SCANNING SYSTEMS WITH IMAGE CURVATURE CORRECTING MEANS

[75] Inventor: David Thomas Collier, Dunstable, England

[73] Assignee: Hawker Siddeley Dynamics Limited, England

[22] Filed: May 29, 1975

[21] Appl. No.: 581,871

[30] Foreign Application Priority Data

June 10, 1974 United Kingdom ............ 25707/74

[52] U.S. Cl. .................................. 350/7; 250/236
[51] Int. Cl.² ......................................... G02B 27/17
[58] Field of Search ................ 350/7, 6, 22, 25, 26, 350/27, 285, 190, 211, 175 FS; 250/234–236, 203 R; 178/7.6, DIG. 27; 244/3.16

[56] References Cited

UNITED STATES PATENTS

| | | | |
|---|---|---|---|
| 1,972,019 | 8/1934 | Kanolt | 350/27 |
| 2,952,180 | 10/1960 | Estes | 350/211 |
| 3,277,772 | 10/1966 | Atwood | 350/7 |
| 3,647,956 | 3/1972 | Buck et al. | 350/7 |
| 3,778,129 | 12/1973 | Wildhaber | 350/6 |
| 3,802,759 | 4/1974 | Andersson | 350/7 |

*Primary Examiner*—John K. Corbin
*Assistant Examiner*—Jon W. Henry
*Attorney, Agent, or Firm*—Rose & Edell

[57] ABSTRACT

In an optical scanning system having a rotary scanner with multiple reflectors, which scanner images a light-responsive detector and moves that image repeatedly across the flat image field of an objective to generate a scanning raster, an optical corrector is mounted in the beam imaging the detector to correct for the fact that the detector image moves in a curved path. The optical corrector has a stepped surface such as to adjust the detector image incrementally during a scan, in the direction normal to the plane of the image field of the objective, so as to make the detector image motion substantially parallel to said image field.

6 Claims, 8 Drawing Figures

U.S. Patent  April 26, 1977  Sheet 1 of 2  4,019,804
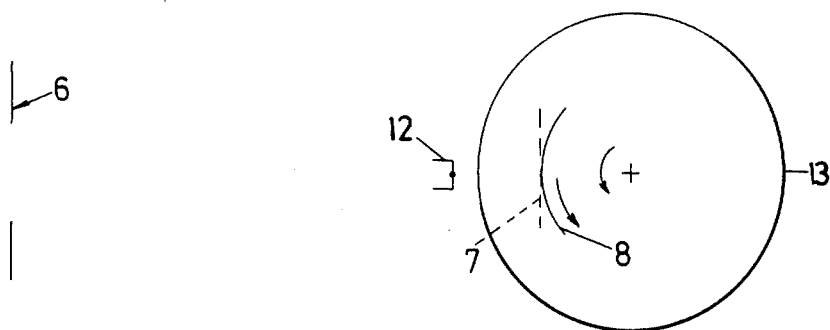
FIG.1A.
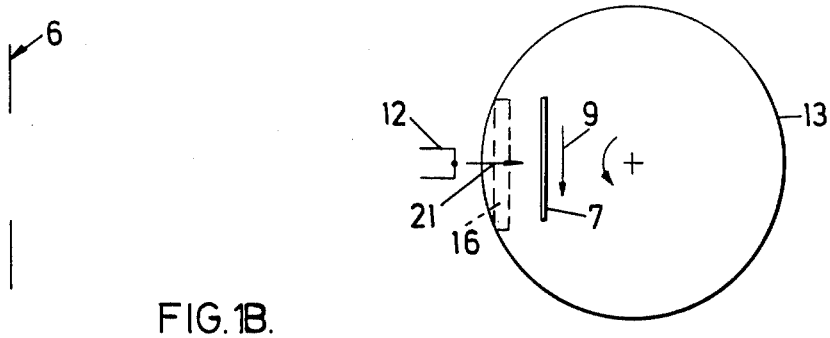
FIG.1B.
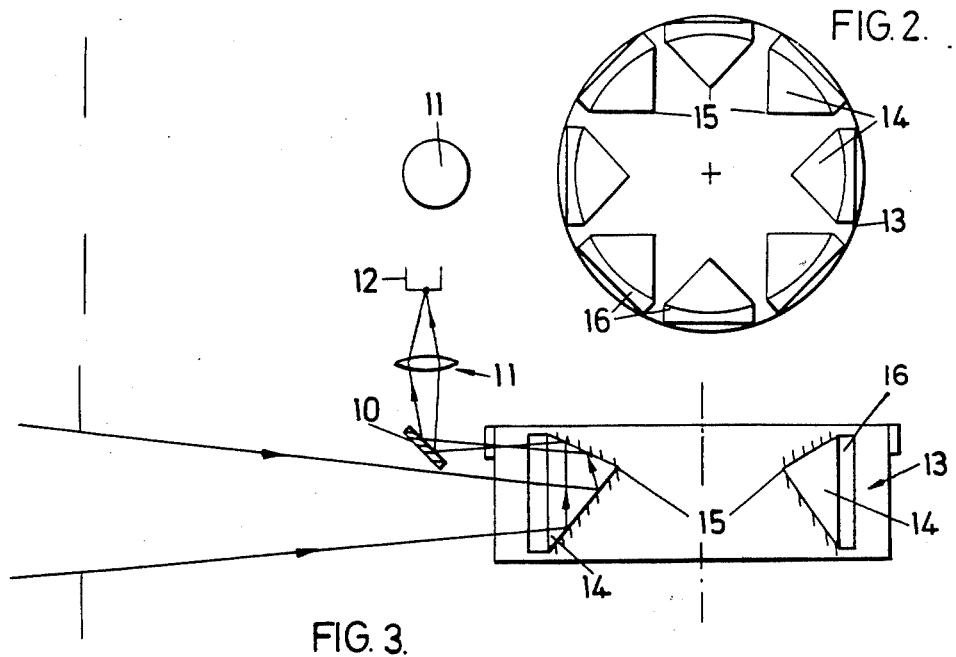
FIG.2.
FIG.3.

OPTICAL SCANNING SYSTEMS WITH IMAGE CURVATURE CORRECTING MEANS

This invention relates to optical scanning systems, and especially those using infrared detectors. In a common form of thermal imager, a lens system forms an image of the object to be examined. This image is scanned by an infrared detector or an array of detectors to produce an electro-video waveform. This electrical signal is used to modulate the brightness of either a cathode ray tube spot or a light-emitting device which is deflected over a similar raster to reconstruct a visible image of the object. Generally, it is not possible to move the infrared detector itself to generate the raster scan, but instead, a scan mechanism is used which forms an image of the detector, the image moving to generate the raster.

A number of forms of scan mechanisms which carry out this function are known: the preferred types use a set of single mirrors or mirror groups attached to a rotating drum. In general, but not always, this circular motion of the mirrors results in the detector image moving along a curved path.

If the scanner is arranged so that the detector image moves over a flat surface which matches the optics image surface, the field is scanned in a series of curved raster lines. If light-emitting devices are used the display raster can be curved to match the detector scan and no distortion is introduced by the display. A cathode ray tube display, however, introduces distortion or an additional scan conversion system is required.

If the scanned lines are made linear the scan curvature makes the matching of the detector motion and the lens image field difficult if not impossible. (The curvation is usually excessive because of design constraints and the need for a small scanner). The usual method of adjusting the curvature of the image field by including additional components in the lens design is normally only possible if the curvature is moderate. It is an object of this invention to overcome the problem.

According to the present invention there is provided an optical scanning system comprising a rotary scanner forming an image of a light-responsive or light-emitting device and moving it to generate a raster whereby said device image scans the flat image field of an objective or display optical system, characterised by an optical correcting means in the path of the beam forming said device image to adjust said image during the scan by different amounts in a direction normal to said flat image field and thereby optically match the device image motion to said flat image field.

Figure 4B:
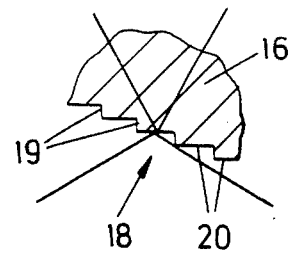
Figure 5A:
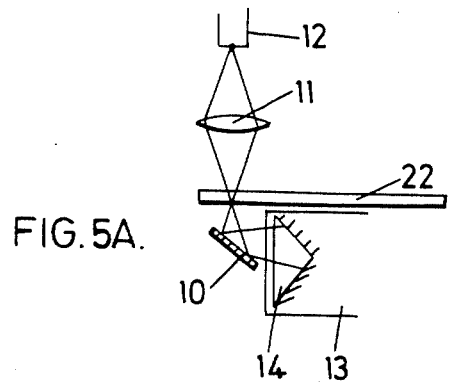
Figure 5B:
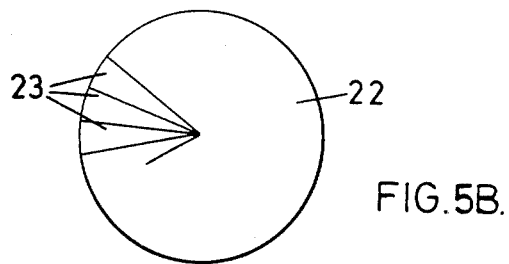

Arrangements embodying the invention will now be described by way of example and with reference to the accompanying drawings, in which:

FIGS. 1A and 1B illustrate the result it is desired to achieve,

FIGS. 2 and 3 are, respectively, a diagrammatic plan and elevation of a scanning system embodying the invention, FIG. 4A shows an optical corrector employed in the system of FIGS. 2 and 3, FIG. 4B shows a detail of the corrector of FIG. 4A, FIG. 5A shows in elevation a modified scanning system, and FIG. 5B is a plan view of a corrector disc employed in the system of FIG. 5A. FIG. 1A shows the situation in an uncorrected system. At the scanner 13, the objective 6 has a flat plane image field 7, whereas the motion of the image of the detector 12 produced by the scanner 13 is curved as at 8. The invention achieves the situation in FIG. 1B, in which the detector image motion is made substantially rectilinear and parallel to the objective image field 7, as indicated by the arrow 9, by means of an optical correction component 16 which adjusts the detector image by appropriate different amounts in the direction normal to the image field 8 as indicated by the arrow 21.

Referring now to FIGS. 2 and 3, transfer optics 11 and a beam-folding mirror 10 produce an image of a single or multi-element detector 12 near the periphery of the scanning drum 13, the beam passing through the scan corrector 16. The scanner 13 is a drum with a series of single or multiple reflectors arranged round its periphery to sequentially scan the raster pattern as the drum rotates. The preferred form shown has a series of eight corner cubes 14 arranged with their apices 15 at equal radii in a helix along the drum so that each scanned line or set of scanned lines in contiguous with its neighbour.

Near the detector image across the aperture of each corner cube 14 is attached the scan correction device 16. This is illustrated separately in FIGS. 4A and 4B. It consists of a cylindrical lens made of infrared transmitting material. One surface 17 is plane and the other 18 consists of small discrete steps 19 the face 20 of each parallel to the plane surface 17 and the depths being such that the mean profile follows a part-circle curve. The detector image produced by the transfer optics 11 appears to the scanner 13 as a new image whose position depends on the thickness of the corrector lens 16 traversed by the beam. At the edge of the scan where the corrector lens 16 is thicker the image appears closer to the respective corner cube 14 than it does at the centre, correcting the scan curvature and resulting in a plane detector image scan.

In fact, the detector image adjusts in a series of steps corresponding to the steps 19 in the corrector surface 18 but by making them sufficiently small it is possible to match the detector image scan surface and the objective focus surface within desired limits.

If the corrector 16 were to be designed with a smoothly curved surface the relative inclination of the two surfaces would swing the beam through a large angle and upset the operation of the optics.

As alternative design, shown in FIGS. 5A and 5B, is to have the corrector in the form of a disc 22 rotating through the transfer optics focus. This disc, consisting of different thickness sectors 23, has its rotation synchronised with that of the scanner 13 so that each complete revolution can correct the curvature of one or more corner cubes 14.

Another technique is to move one or two mirrors to alter the position of the detector image as the scanner rotates.

This mirror motion must be synchronised with the scanner rotation by using e.g. a cam mechanism or an electromechanical device controlled by an electrical signal representing the angular position of the scanner.

A method of displaying the detector video signal, alternative to using a cathode ray tube, is to view a single or multielement light-emitting device, brightness-modulated by the amplified video signal, through a display scanner synchronised with the infrared scanner to reconstruct the scanned field. Obtaining a flat image field from the display scanner is not essential because the eye can refocus as it moves across the scene but the invention is also applicable to display scanners.

I claim:

1. An optical scanning system comprising a rotary scanner, transfer optical means generating a beam that forms adjacent the periphery of said rotary scanner an image of a light-responsive or light-emitting device, optical objective means having a flat image field adjacent said image formed by said beam, said rotary scanner comprising a series of reflectors arranged around the periphery of said scanner and sequentially sweeping said image across said image field as the scanner rotates to generate a raster, and optical correcting means disposed in the path of the beam forming said image which optical correcting means having a surface configured with a multiplicity of incremented steps of such size to adjust the position of said image by a multiplicity of incremental amounts in a direction normal to said flat image field during the passage of each reflector past said field to compensate for curvature of the image introduced by the transfer optical means, the angle of the beam forming said image being maintained constant during said image position adjustments, thereby making the image motion during scanning substantially rectilinear and parallel to said flat image field.

2. A system according to claim 1, wherein said optical correcting means comprises at least one rotary optical correcting component rotating in synchronism in the scanner.

3. A system according to claim 2, wherein each said optical correcting component is a cylindrical lens with one flat plane surface and the opposite surface nominally curved but having discrete incremental steps with the faces of the steps parallel to said flat plane surface.

4. A system according to claim 3, wherein the scanner reflectors are an annular series of corner cubes and each corner cube has its own optical correcting component.

5. A system according to claim 2, wherein said rotary optical correcting component is a disc with sectors of different thickness rotating through the focus of said transfer optical means imaging said light-responsive or light-emitting device.

6. A system according to claim 1 wherein the light is infra-red, the light-responsive device is an infra red detector and the correcting means is transparent to infrared.